Aug. 7, 1956  O. M. WHITTEN  2,757,947
LUBRICATING SEAL
Filed Oct. 5, 1953
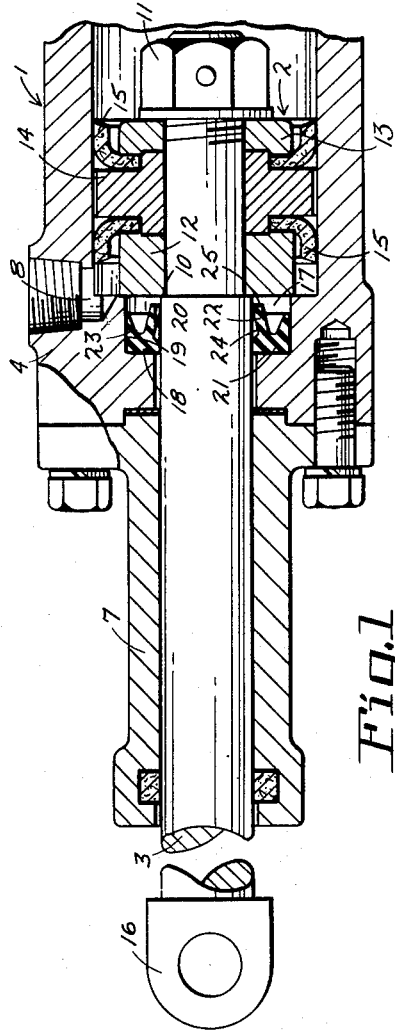
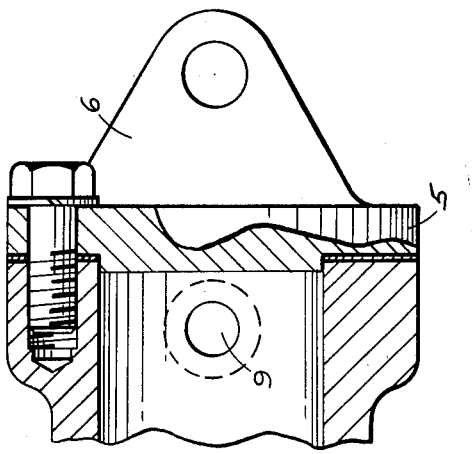
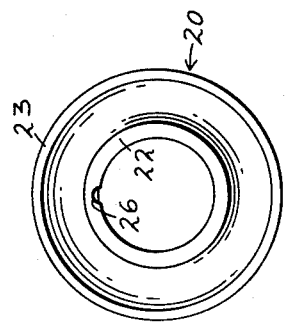
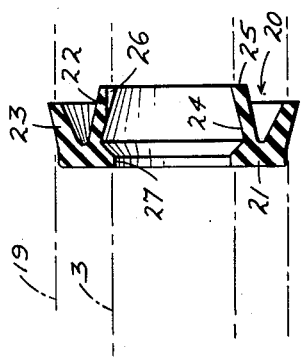
Fig.1
Fig.2
Fig.3
INVENTOR.
OWEN M. WHITTEN.
BY

United States Patent Office 2,757,947
Patented Aug. 7, 1956

2,757,947

LUBRICATING SEAL

Owen M. Whitten, Detroit, Mich., assignor to Kelsey-Hayes Wheel Company, Detroit, Mich., a corporation of Delaware Application October 5, 1953, Serial No. 383,966

3 Claims. (Cl. 288—4)

The invention relates to lubricating seals and refers more particularly to flexible lubricating seals for use in hydraulic cylinders.

The invention has for one of its objects the provision of an improved seal between the cylinder and piston rod of a hydraulic cylinder constructed to force sufficient liquid forming the medium for energizing the hydraulic cylinder along the piston rod to lubricate its bearing.

The invention has for another object to so construct the seal that it is intermittent in operation and depends for its operation on the pressure of the energizing medium to which it is subject.

With these and other objects in view, the invention resides in the novel features of construction and combinations and arrangements of parts as more fully hereinafter set forth.

In the drawings:

Figure 1 is a sectional view of a hydraulic cylinder embodying the invention;

Figure 2 is a sectional view of the lubricating seal in normal state before assembly;

Figure 3 is an end view of Figure 2.

The hydraulic cylinder, as shown, comprises the cylinder 1, the piston 2 slidable within the cylinder and the piston rod 3 extending out through one end of the cylinder. The cylinder 1 has at its ends the integral centrally apertured wall 4 and the bolted on cap 5, the latter having the apertured flange 6 for mounting the cylinder on a suitable support. The cylinder is also provided with the bolted on axially aligned bearing 7 beyond the end wall 4 for the piston rod 3. 8 and 9 are ports in the wall of the cylinder inside the end wall 4 and cap 5 for the entrance and discharge of liquid medium under pressure for reciprocating the piston 2.

The piston and piston rod are secured together by clamping the piston against the annular shoulder 10 of the piston rod by means of the nut 11 threaded on the piston rod. As shown, the piston has the end plate 12 abutting the annular shoulder 10, the end plate 13 abutted by the nut 11, the intermediate plate 14 and the oppositely facing sealing cups 15 between the end plates and intermediate plate and slidably engaging the wall of the cylinder.

The piston rod extends freely through the central aperture in the end wall 4 and slidably engages the bearing 7 and has at its outer end the apertured head 16 for connection with an element to be moved by the hydraulic cylinder.

For the purpose of effecting a seal and lubricating the bearing for the piston rod, the end wall 4 is formed with the central pocket or recess 17 opening into the interior of the cylinder 1 and having the radial bottom surface 18 and the cylindrical surface 19 and the lubricating seal 20 is provided within the pocket. This seal is flexible, it being formed of rubber, which in the present instance is synthetic. The seal has the flat annular base 21 and the inner and outer lips 22 and 23, respectively. The base is in contact with the radial bottom surface and has its inner peripheral portion in contact with the piston rod. The inner and outer lips are concentric and extend from the base toward the open end of the pocket or recess 17. The outer lip is of progressively decreasing thickness or tapers in thickness from its junction with the base to its free end and is under compression and contacts the cylindrical surface 19. The inner lip is of substantially the same thickness from its junction with the base to its free end and joins the base radially outwardly of its inner periphery and has the radially inner surface 24 progressively decreasing in diameter or tapering to its free end and the radially inner portion of the free end 25 provided with the axially extending recess 26. As a result, the inner lip and base form with the piston rod an annular pocket and a communicating inlet opening which inlet opening provides for entrance of the liquid medium in the cylinder into the annular pocket. The inner lip being flexible is adapted to be flexed toward the piston rod 3 upon increase in pressure of the liquid medium surrounding the inner lip to thereby reduce the annular pocket and force liquid medium in the pocket between the base and piston rod to the bearing. The size of the annular pocket and the amount of radially inward flexing of the inner lip is limited to secure a relatively small discharge of the liquid medium just sufficient to lubricate the bearing each time the inner lip is flexed inwardly.

As shown in Figures 2 and 3, the base 21 of the seal in its natural state and before assembly in the pocket 17 has the central hole 27 of smaller diameter than that of the piston rod. The radially outer surface of the outer lip is flared from its junction with the base to its free end and the outer diameter of its major portion is greater than the diameter of the cylindrical surface. Also, the internal diameters of the inner lip at its junction with the base and at its free end are respectively greater and less than the diameter of the piston rod. In addition, the recess in the radially inner portion of the free end is semi-circular and of relatively small radius.

In operation, the liquid medium enters the inlet opening and annular pocket while the piston is being moved toward the end wall 4. The liquid medium is forced from the annular pocket between the base and piston rod while the piston is being moved in the opposite direction, the pressure of the liquid medium acting upon the inner lip at this time being greater than when the piston is moving in the first mentioned direction.

What I claim as my invention is:

1. A flexible lubricating seal comprising an annular base adapted to contact a radial supporting surface, said base having an inner cylindrical surface adapted to contact an inner cylindrical member, and inner and outer annular lips extending generally axially in one direction from said base, said outer lip being adapted to contact and form a seal with an outer cylindrical member, the inner annular surface of said inner lip connecting into said base radially outwardly of said inner cylindrical surface and radially outwardly of said inner member and tapering radially and axially inwardly from said base to the free end of said inner lip for contact with the inner cylindrical member at said free end, said inner annular surface of said inner lip and said base forming with the inner cylindrical member an annular pocket, the inner annular surface of said inner lip at the free end thereof having a recess forming with the inner cylindrical member an inlet opening communicating with said pocket, said inner lip being flexible and being movable toward the inner cylindrical member by liquid under pressure surrounding said inner lip to thereby reduce said pocket and force liquid from said pocket between the inner cylindrical surface of said base and the inner cylindrical member.

2. A flexible lubricating seal comprising an annular base adapted to contact a generally radial supporting surface, said base having an inner annular surface adapted to contact an inner annular member, and inner and outer annular lips extending generally axially in one direction from said base, said outer lip being adapted to contact and form a seal with an outer annular member, the inner annular surface of said inner lip having a first annular surface portion at the free end of said inner lip adapted to contact the inner annular member, the inner annular surface of said inner lip having a second annular surface portion between said free end and said base spaced radially outwardly of the inner annular member and radially outwardly of the inner annular surface of said base and said first annular surface portion to form with the inner annular member an annular pocket, said first annular surface portion having a recess therein forming with the inner annular member an inlet opening communicating with said pocket, said inner lip being flexible for movement toward the inner annular member by liquid under pressure surrounding said inner lip to thereby reduce said pocket and force liquid from said pocket between said inner annular surface of said base and the inner annular member.

3. A flexible lubricating seal comprising an annular base adapted to contact a generally radial supporting surface, said base having an inner annular surface adapted to contact an inner annular member, and inner and outer annular lips extending generally axially in one direction from said base, said outer lip being adapted to contact and form a seal with an outer annular member, the inner annular surface of said inner lip having an annular surface portion at the free end of said inner lip adapted to contact the inner annular member, the inner annular surface of said inner lip having a surface portion between said free end and said base spaced radially outwardly of the inner annular member and radially outwardly of the inner annular surface of said base and said annular surface portion to form with the inner annular member a pocket, said annular surface portion having a recess therein forming with the inner annular member an inlet opening communicating with said pocket, said inner lip being flexible for movement toward the inner annular member by liquid under pressure surrounding said inner lip to thereby reduce said pocket and force liquid from said pocket between said inner annular surface of said base and the inner annular member.

References Cited in the file of this patent

UNITED STATES PATENTS

| | | |
|---|---|---|
| 1,868,668 | Mahon | July 26, 1932 |
| 2,007,501 | Millmine | July 9, 1935 |
| 2,131,762 | Smith | Oct. 4, 1938 |

FOREIGN PATENTS

| | | |
|---|---|---|
| 866,585 | Germany | Mar. 5, 1953 |
| 953,988 | France | June 6, 1949 |